2/17/87 XR 4,644,352

United States Patent [19]

Fujii

[11] Patent Number: 4,644,352

[45] Date of Patent: Feb. 17, 1987

[54] RADIO WAVE DATA TRANSMISSION WATCH DEVICE

[75] Inventor: Hiroshi Fujii, Tokyo, Japan

[73] Assignee: Casio Computer Co., Ltd., Tokyo, Japan

[21] Appl. No.: 713,231

[22] Filed: Mar. 18, 1985

[30] Foreign Application Priority Data

| | | | |
|---|---|---|---|
| Mar. 30, 1984 | [JP] | Japan | 59-62696 |
| Nov. 13, 1984 | [JP] | Japan | 59-240302 |
| Nov. 13, 1984 | [JP] | Japan | 59-172827[U] |
| Dec. 14, 1984 | [JP] | Japan | 59-262848 |

[51] Int. Cl.[4] .................. H04Q 7/00; H04B

[52] U.S. Cl. .................. 340/825.440; 340/825.69; 340/825.55; 340/712; 455/115

[58] Field of Search .................. 340/825.31, 825.69, 340/365 S, 712, 807, 825.56, 825.44, 825.55; 178/18; 455/127, 73, 89, 115

[56] References Cited

U.S. PATENT DOCUMENTS

| | | | |
|---|---|---|---|
| 3,937,004 | 2/1976 | Natori et al. | 340/825.44 |
| 4,477,797 | 10/1984 | Nakagiri | 340/712 |
| 4,573,046 | 2/1986 | Pinnow | 340/825.56 |

*Primary Examiner*—Donald J. Yusko
*Attorney, Agent, or Firm*—Frishauf, Holtz, Goodman & Woodward

[57] ABSTRACT

A radio wave data transmission apparatus comprises a plurality of switches, a data converter and a transmission section. The switches are selectively activated by a finger tip being moved as if to write a character, thereby providing data showing a character. The data converter converts this data into radio wave signals. These signals are transmitted from a transmission section.

13 Claims, 25 Drawing Figures

RADIO WAVE DATA TRANSMISSION WATCH DEVICE

BACKGROUND OF THE INVENTION

The present invention relates to a radio wave data transmission apparatus for transmitting data between pieces of compact electronic equipment or between a compact piece of electronic equipment and a large communication station.

Conventional radio wave portable data transmitters/-receivers include pocket bells with or without a message display function. Such a pocket bell converts message data into radio wave signals and transmits them.

In order to receive transmission data, an input device is required. However, since transmission data includes numerical data, character data, or other input data of graphics or symbols, a large input device is required to receive all these kinds of data.

More specifically, if data to be transmitted/received is limited to that corresponding to numerical or character keys arranged in each transmitter or receiver, graphic or symbol data cannot be transmitted. A device capable of transmitting/receiving such data is bulky. In addition, since the operator must select the desired key from a large number of keys, input procedures are time-consuming.

SUMMARY OF THE INVENTION

It is an object of the present invention to provide a radio wave data transmission apparatus which is free from the problems as described above and which can be adapted in compact electronic equipment such as electronic wristwatches.

In order to achieve the above object of the present invention, there is provided a radio wave transmission apparatus comprising: switch means having a plurality of switches; means for generating data input by activating the switch means with a finger as handwritten data; converting means for converting the handwritten data generated by the handwritten data generating means into radio wave signals; and transmitting means for transmitting the radio wave signals obtained by the converting means.

With the data transmission apparatus of the above configuration according to the present invention, the number of switches used is small, mounting of the apparatus on compact electronic equipment such as an electronic wristwatch is easy, and character input operation is simplified.

Data input by finger activating can be transmitted with or without conversion into radio wave signals. Therefore, data such as graphic data can also be transmitted in addition to character data.

BRIEF DESCRIPTION OF THE DRAWINGS

FIG. 1 is a front view of an electronic wristwatch according to an embodiment of the present invention;

DETAILED DESCRIPTION OF THE PREFERRED EMBODIMENTS

Figure 3:
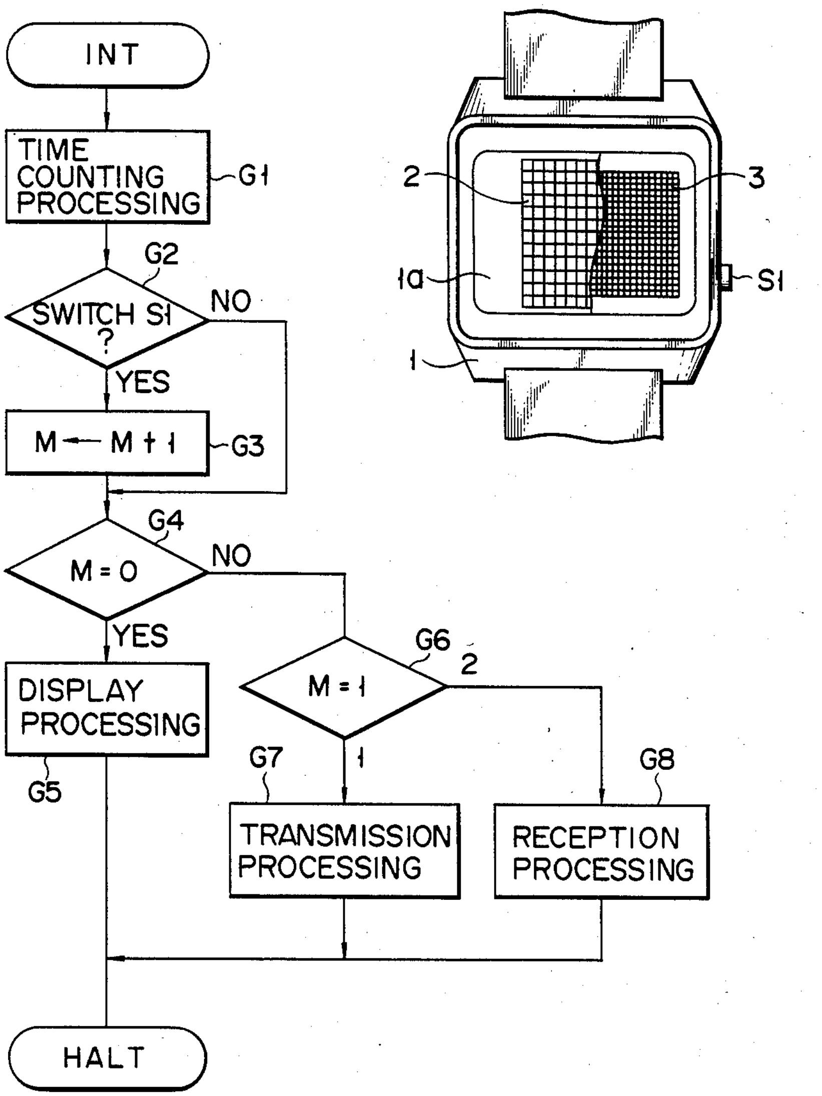
FIG. 3 is a general flow chart for explaining the mode of operation of the circuit shown in FIG. 2.

A preferred embodiment of the present invention will be described with reference to FIGS. 1 to 7 wherein the present invention is applied to an electronic wristwatch. Referring to FIG. 1, a total of 144 transparent touch electrodes or touch switches 2 are arranged in a 12×12 matrix on the upper surface of a glass cover 1*a* of a case 1 of the electronic wristwatch. 30×20 dot matrix LED elements are arranged on the lower side of the glass cover 1*a* of the case 1 so as to partially overlap the touch switches 2 and to constitute a display section 3.

The touch switches 2 and the LED elements are electrically connected to an LSI (Large Scale Integrated Circuit) inside the case 1. A switch S1 is arranged at one side of the case 1 so as to allow setting of a mode M (to be described later) of the wristwatch in one of modes 0, 1 and 2.

The circuit configuration will be described with reference to FIG. 2. A ROM (read-only memory) 5 stores a microprogram for controlling the overall operation of the electronic wristwatch. The ROM 5 supplies microinstruction (address data) AD to a RAM (random access memory) 6, microinstruction (operation code) OP to an operation decoder 8, and microinstruction (next address) NA to an address section 9.

The RAM 6 exchanges data with a calculation section or calculator 7. The RAM 6 has a number of registers which store various data such as calculation results, i.e., time data obtained by a calculation performed every 1/16 seconds by the calculation section 7, or data generated during transmission or reception processing. Data a and a carry b generated when the calculation section 7 performs a predetermined decision are supplied to the address section 9 so as to generate the next access address of the ROM 5.

The operation decoder 8 decodes the microinstruction OP so as to generate control signals c, d, e, f and g. The control signals c, d, e, f and g are gate control signals to be supplied to gate circuits G1, G2, G3, G4 and G5.

A signal of a predetermined frequency (e.g., 32678 Hz) oscillated by an oscillator 10 is frequency-divided by a frequency divider 11 and the obtained signal of, for example, 16 Hz is also supplied to the address section 9. Then, the address section 9 supplies address data to the ROM 5 so as to read out a calculation processing flow or the like therefrom once every 1/16 seconds.

The display section 3 displays the time data read out from the RAM 6 through the gate circuit G1. The touch switches 2 are arranged at an input section 4. Scan data generated by the calculation section 7 is supplied to the input section 4. The input section 4 performs coordinate detection and the obtained coordinate data is supplied to the calculation section 7 through the gate circuit G5. The calculation results are stored in the RAM 6.

A reception section 12 receives radio wave signals transmitted from another electronic wristwatch and supplies them to a data converter 13 for data conversion. The reception data is supplied to the calculation section 7 through the gate circuit G4 and is written in the RAM 6. When data in the RAM 6 is to be transmitted to another electronic wristwatch, the data is supplied to a data converter 14 through the gate circuit G2 and is transmitted by a transmitter section 15.

The mode of operation of the electronic wristwatch will be described with reference to the flow charts in FIGS. 3 to 6. The description will begin with the general flow chart shown in FIG. 3. Every time a 16 Hz signal is supplied from the frequency divider 11 to the address section 9, this general flow is started. The time counting processing of step G1 is performed first. The calculation section 7 reads out the previous time data and adds a predetermined value thereto so as to obtain new time data which is stored in the RAM 6. It is checked if the switch S1 is ON (step G2). If NO in step G2, it is then checked if the mode M is "0" (step G4). If M=0, the display processing of step G5 is performed; the time data from the RAM 6 is read out and the read-out data is supplied to the display section 3 and displayed.

However, if the mode M is not "0", the flow advances to step G6 wherein it is checked if the mode M=1. If M=1, the transmission processing in step G7 is performed. Data is supplied to the data converter 14 to be converted into serial data and transmitted to another electronic wristwatch from the transmission section 15. However, if M≠1, i.e., M=2, the reception processing of step G8 is performed. In step G8, radio wave signals from another electronic wristwatch are received by the reception section 12. The received radio wave signals are converted into data by the data converter 13 and the data is stored in the RAM 6. The data "0" or "1" of the mode M is set in the registers in the RAM 6.

Figure 4A:
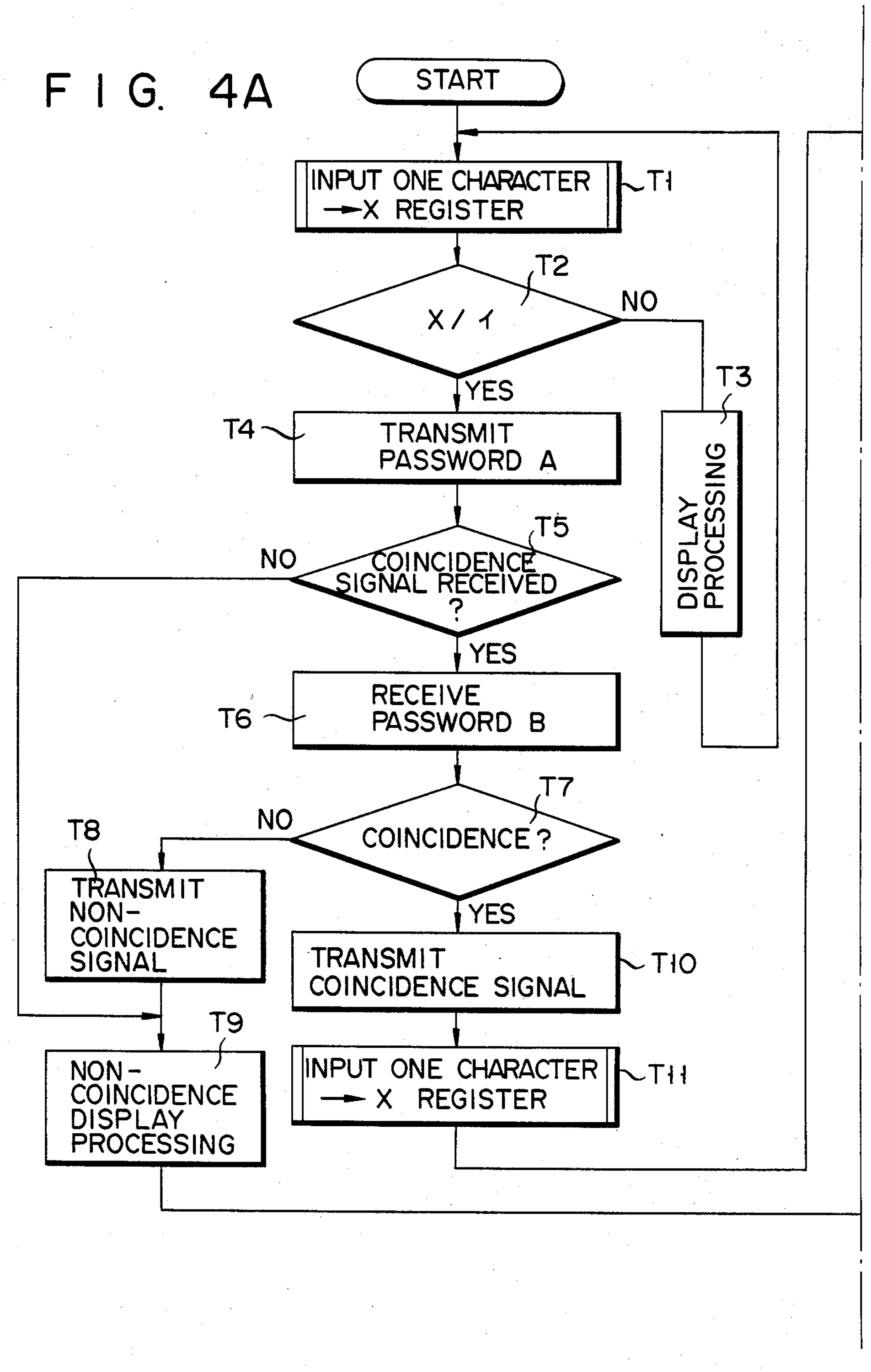
FIGS. 4A and 4B together form a flow chart of the transmission processing in the circuit shown in FIG. 2.
Figure 4B:
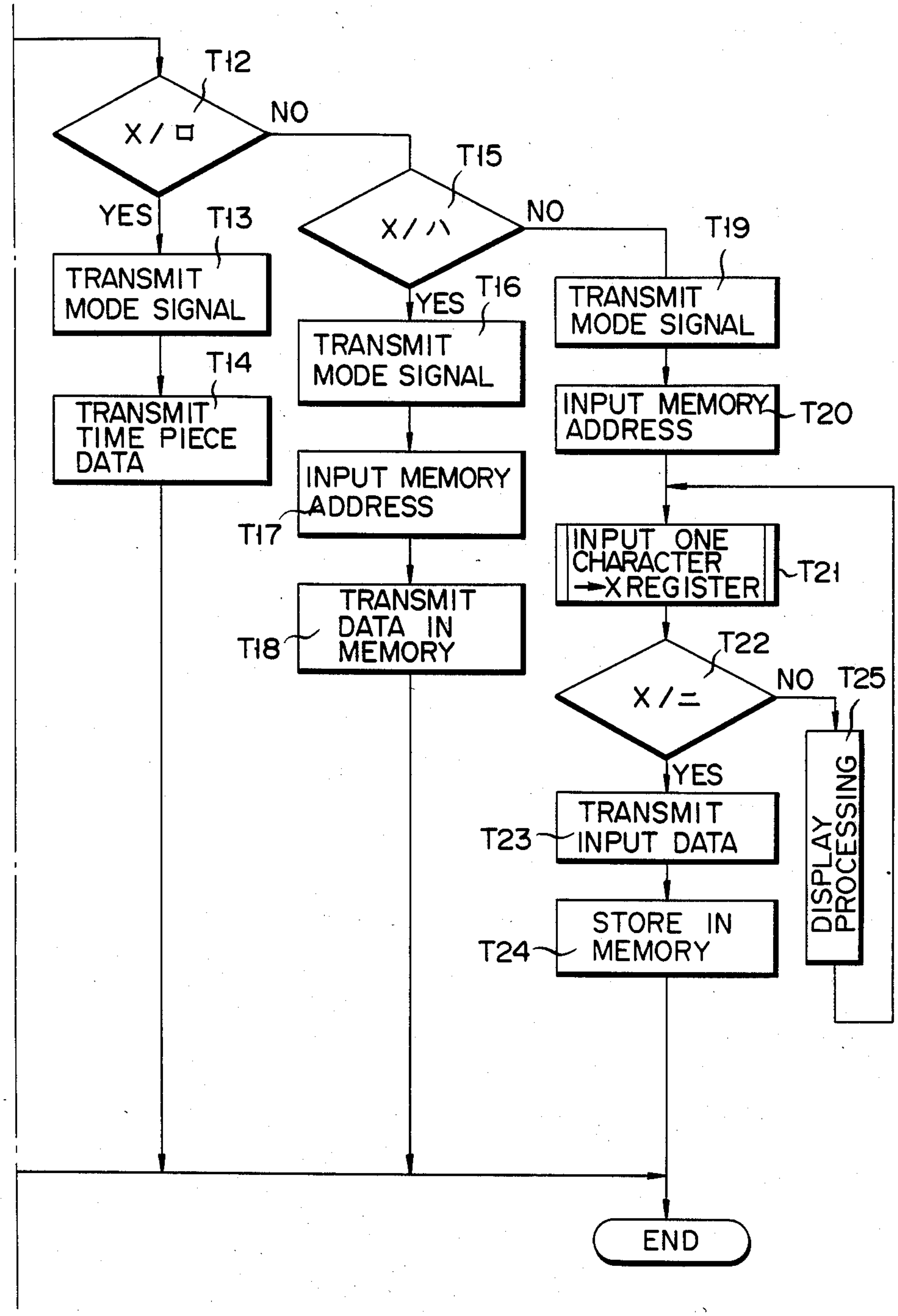

The flow of the transmission processing in step G7 will be described with reference to FIG. 4. When transmission processing is started, a character "ʎ" designating the password transmission mode is input by tracing on the touch switches 2 with a finger. When this single character input is performed, character data "ʎ" is written in the X register of the RAM 6 by the calculation section 7 (step T1). In step T2, it is checked if the input data in the X register is "ʎ". If YES in step T2, the flow advances to step T4 for password A transmission processing. In this processing, a predetermined password is input by operating the touch switches 2, and the password data is transmitted to the other electronic wristwatch from the transmission section 15 through the calculation section 7 and the data converter 14.

However, if NO in step T2, the flow advances to step T3 and the input character is displayed at the display section 5.

When step T4 is completed, the other electronic wristwatch receives the password A and checks if the received password A coincides with its own password A. The other electronic wristwatch then generates a coincidence signal or a non-coincidence signal in accordance with the result. The electronic wristwatch receives the coincidence or non-coincidence signal and executes step T5 to check if the coincidence signal has been received. If YES in step T5, the electronic wristwatch receives another password B which is also transmitted from the other electronic wristwatch (step T6). However, if NO in step T5 (if the non-coincidence signal is received), the flow jumps to step T9 and a predetermined non-coincidence display is displayed on the display section 3.

After step T6, step T7 is performed. In step T7, it is checked if the received password B coincides with its own password B stored in the RAM 6. If YES in step T7, a coincidence signal is transmitted from the transmission section 15 to the other electronic wristwatch (step T10). However, if NO in step T7, a non-coincidence signal is transmitted (step T8) and the non-coincidence display processing of step T9 is performed.

When T10 is completed, a given character X other than characters "□" and "∧" or other than "ʎ", "□", "∧", and "=" is input through the touch switches 2 so as to designate a desired mode (step T11). The character "□" represents timepiece data transmission mode, the character "∧" represents the transmission mode of data in the RAM 6, characters other than the characters "ʎ" to "=" represent the transmission modes of the corresponding characters, and the character "=" represents an end of character input. When the character "□" is input, this is determined in step T12. The flow advances to step T13 wherein the corresponding mode signal is received. The timepiece data is then read out from the RAM 6 and is transmitted (step T14).

When the character " ∧ " is input, the flow advances from step T12 to step T15. In step T15, it is checked if the character " ∧" is input. The corresponding mode signal is transmitted in step T16. An address of the RAM 6 is input by the touch switches 2 (step T17), and data is read out from this address and transmitted (step T18).

When a character other than the characters " λ " to " ∧ " is input, the flow advances from step T12 or T15 to step T19 and the corresponding mode signal is transmitted (step T19). An address of the RAM 6 is input by the touch switches (step T20). Desired data is then input one character at a time, and the input character is sequentially written in the X register and is also displayed at the display section 3 (repetition of steps T21, T22 and T25). When data input is completed, the character " = " is input. When inputting of the character " = " is determined in step T22, the flow advances to step T23. The input data in the X register is read out and transmitted. The transmitted data is written at the designated address of the RAM 6 (step T24).

Figure 5:
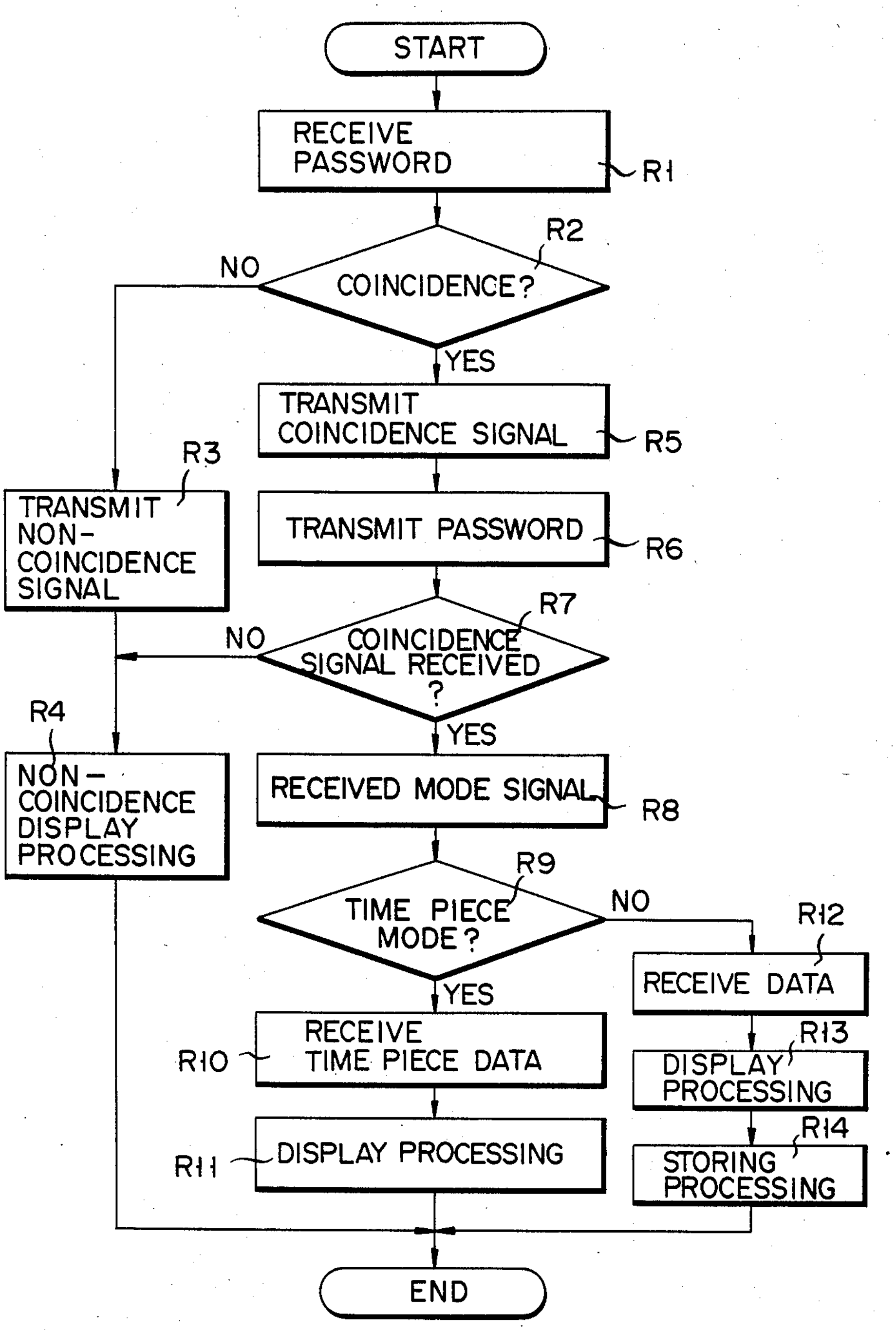
FIG. 5 is a flow chart of the reception processing in the circuit shown in FIG. 2.

The reception processing of step G8 will be described with reference to FIG. 5. When the reception processing is started, the password reception processing of step R1 is started. It is then checked if the received password coincides with its own password stored in the RAM 6 (step R2). If they do not coincide, a non-coincidence signal is transmitted (step R3) and the non-coincidence display processing is performed (step R4). However, if they coincide, the flow advances to step R5 to transmit a coincidence signal. A predetermined password is also transmitted (step R6). Another electronic wristwatch receives this password, compares it with its own password and sends a coincidence or non-coincidence signal. The electronic wristwatch then checks if the received signal is a coincidence or non-coincidence signal (step R7). If the received signal is determined to be a non-coincidence signal, the non-coincidence display processing of step R4 is performed. However, if the received signal is determined to be a coincidence signal, the flow advances to step R8. In step R8, a mode signal from the other electronic wristwatch is received. It is then checked in step R9 if the received mode signal represents the timepiece mode. If YES in step R9, the timepiece data transmitted from the other electronic wristwatch is received (step R10) and is displayed (step R11). However, if NO in step R9, the data from the other electronic wristwatch is received (step R12), displayed (step R13) and written in the RAM 6 (step R14).

Figure 6:
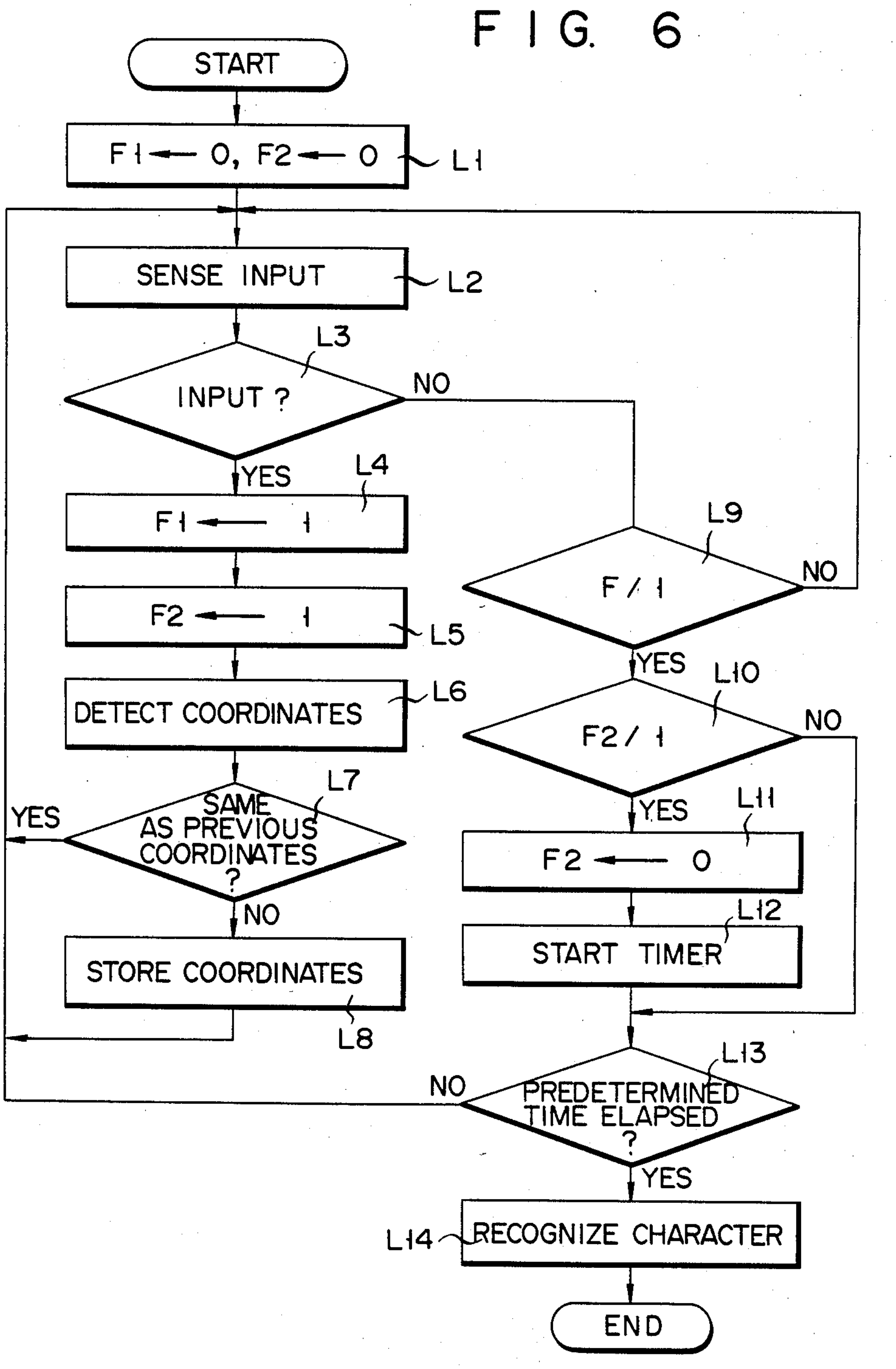
FIG. 6 is a flow chart of a subroutine for inputting a single character.

The flow of the single character input of step T11 or the like will be described with reference to FIG. 6. When a character is input by the touch switches 2, flag registers F1 and F2 of the RAM 6 are cleared; data "0" is written therein (step L1). A capacitance change upon a finger touch on the touch switches 2 is detected so as to determine if a character is input (steps L2 and L3). When it is determined that a character is input, data "1" is set in both the flag registers F1 and F2 (steps L4, L5), and coordinate detection is performed (step L6). Coordinate detection is performed by determining the coordinates of a touch electrode which have a maximum contact capacitance. It is then checked in step L7 if the calculated coordinates are the same as the previous coordinates. If YES in step L7, the flow returns to step L2 and processing of step L3 and thereafter is started again. If NO in step L7, the flow advances to step L8 and these coordinates are stored in a predetermined register of the RAM 6 and the flow returns to step L2.

When it is determined in step L3 that no character has been input, i.e., no capacitance change is detected, the flow advances to step L9. In step L9, it is checked if the flag register F1 is "1". Since the flag register F1 is now "1", the flow advances to step L10. In step L10, it is checked if the flag register F2 is also "1", i.e., if one stroke has been input. Since the flag register F2 is also "1" in this case, the flow advances to step L11 wherein the flag register F2 is cleared to "0". The flow advances to step L12 to start a timer in the RAM 6. This timer is started every time one stroke is written. It is then checked in step L13 if the time data of the timer has reached a predetermined time, i.e., if the next operation has not been input within a predetermined period of time since completion of one stroke. If YES in step L13, single character input is detected. Until the predetermined period of time elapses, the flow returns to step L2 to repeat the processing of step L3 and thereafter. When YES in step L13, single character input is recognized in step L14 and the recognized character is supplied to the RAM 6.

Figure 7:
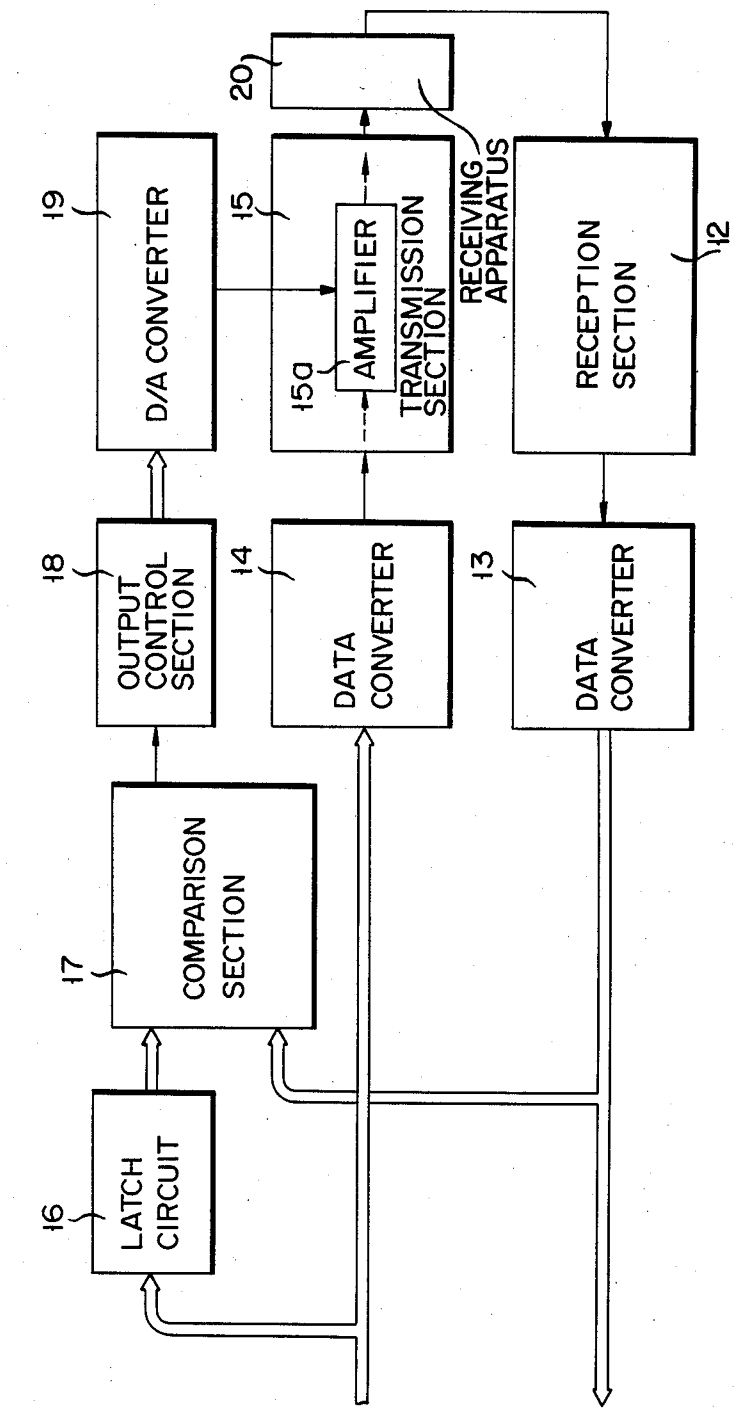
FIG. 7 is a block diagram wherein a transmission section 15 shown in FIG. 2 includes an output control means for controlling the output operation of the transmission section 15.

FIG. 7 shows a block diagram of a circuit wherein an output control means (16, 17, 18, 19) for controlling the output magnitude from the transmission section 15 of the present invention is incorporated therein. With this circuit configuration, data that is erroneous due to insufficient transmission power will not be received by the receiving apparatus, and data can also be transmitted with only a minimum output necessary.

Referring to FIG. 7, a latch circuit 16 latches transmission data, and a comparison section 17 compares an output from the latch circuit 16 with reception data. When the comparison section 17 determines that the transmission and reception data do not coincide, the section 17 supplies a level-up signal to an output control section 18. The output control section 18 generates a control signal for increasing the transmission output by 1 level. The control signal is converted into an analog signal of a predetermined voltage through a D/A converter 19. The gain of an amplifier 15*a* of the transmission section 15 is then increased by 1 level.

After transmission is started, data for output control is transmitted with a minimum output. The transmission data is stored in the latch circuit 16.

Meanwhile, receiving apparatus 20 sends back the same signal as a reception signal to control the transmitting apparatus. The reception signal is supplied to the comparison section 17 through the receiving apparatus 20, reception section 12 and the data converter 13. The comparison section 17 compares the reception and transmission signals. When they coincide, the section 17 determines that the transmitted signal has been received without any error. However, if they do not coincide, the section 17 determines that the transmission output has been too low since the transmitted signal has been erroneously received. Then, the section 17 generates a level-up signal and thereafter retransmits the same data to the transmission section 15. Data is transmitted at a transmission output 1 level higher than the previous output level by means of a variable gain amplifier. When a reception signal is not received by the comparison section 17 within a predetermined period of time since the transmission operation began, the section 17 determines that the receiving apparatus did not receive the transmitted signal. Then, the transmission apparatus sends the same data with an output level 1 level higher than the previous level. In a similar manner to that described above with reference to the reception procedures in the first transmission, the receiving apparatus sends back the same signal as a reception signal to control the transmitting apparatus. When the returned signal does not coincide with the transmission signal or when an input signal is not received by the comparison section 17 within a predetermined period of time since the transmission operation began, the output level is increased by 1 level and retransmission is performed.

In this manner, transmission is repeated until it is confirmed that the transmission signal has been received without error. With this method, data can always be transmitted with a minimum transmission output. The power consumption of each data transmission apparatus can be decreased, which is an advantage when an electronic wristwatch uses a battery, for example, as a power source.

FIGS. 8 to 15 show another embodiment of the present invention. The same reference numerals as in FIG. 2 denote the same parts in FIGS. 8 to 15 and a detailed description thereof will be omitted.

Figure 8:
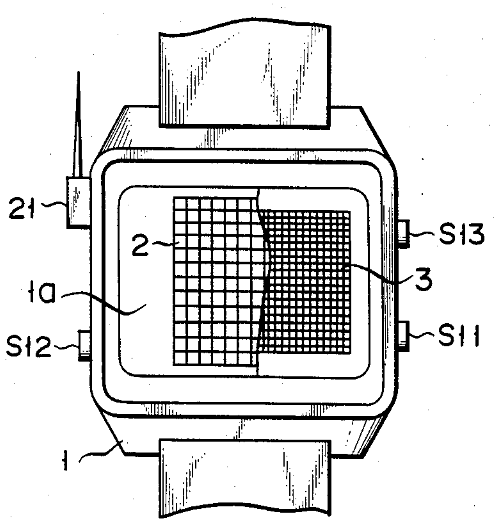
FIG. 8 is a front view of an electronic wristwatch functioning as a transmission/reception apparatus according to another embodiment of the present invention.

FIG. 8 shows the outer appearance of an electronic wristwatch functioning as a transmission/reception apparatus. The wristwatch of this embodiment differs from that of the first embodiment in that it has an antenna 21 and three switches S11, S12 and S13 in the case 1. The switch S1 is a selection switch for mode selection, the switch S2 is a selection switch for selecting transmission of recognized or unrecognized handwritten input, and the switch S13 is a selection switch for selecting transmission of handwritten data or memory data.

Figure 9:
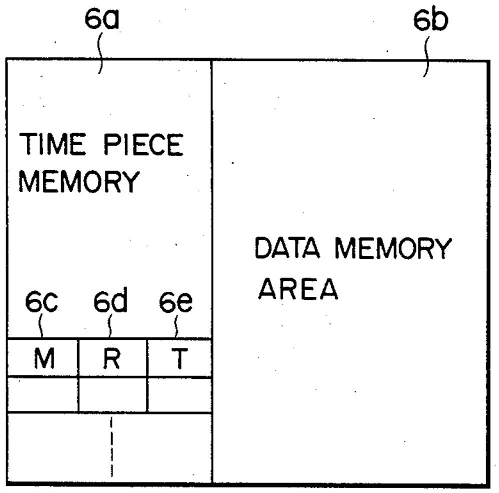
FIG. 9 shows the memory map of the RAM used in the embodiment shown in FIG. 8.

FIG. 9 shows a memory map of the RAM 6. The RAM 6 has a timepiece memory 6*a* for storing time, date, alarm and stopwatch data, and a memory area 6*b* for data storage. The RAM 6 also has an M register 6*c* for determining a mode, an R register 6*d* for determining if an input is to be recognized, a T register 6*e* for determining if handwritten or memory data is to be transmitted, and the like.

The mode of operation of this embodiment will be described with reference to the general flow chart shown in FIGS. 10 and 11.

When a carry input is received from the frequency divider 11 in the HALT state (step H1), time counting processing (step H2) and display processing (step K1) are performed and then the flow returns to the HALT state.

In this case, the display mode is a normal timepiece display mode.

When a key input is received by the selection switch, the flow advances to the next step. That is, it is checked if the switch S11 is ON (i.e., depressed) (step H3). If the switch S11 is OFF (i.e., not depressed), it is then checked in step H8 if the switch S12 is depressed.

The switch S11 checked in step H3 is a mode selection switch which is depressed to select one of the normal mode (timepiece display), the transmission mode, and the reception mode. The mode selection is performed in this order each time the switch S11 is depressed. In step H8, it is checked if the selection switch S12 is ON or OFF.

Note that the switch S12 is a switch for selecting transmission of recognized or unrecognized finger activated data. When the switch S12 is OFF, it is checked if the switch S13 is ON (step H13). The switch S13 is a switch for selecting transmission of finger activated data or memory data.

When the switch S13 is OFF, it is checked in step H7 if the selected mode is the normal mode.

Processing when each switch is determined to be ON will be described. When the M register is 0, the normal mode is selected. When the M register is 1, the transmission mode is selected. When the M register is 2, the reception mode is selected. If the switch S11 is ON in step H3, it is checked if the reception mode is selected (step H4). When it is determined that the reception mode is currently selected, the contents of the M register are changed to those for the normal mode (step H6). Similarly, if the normal mode is currently selected, the contents of the M register are changed to those of the transmission mode (step H5). It is checked in step H7 if the normal mode is selected.

When the R register is "0", recognized finger activated data is transmitted. However, if the R register is "1", the finger activated data is transmitted without being recognized. When the selection switch S12 is determined to be ON in step H8, it is checked if the transmission mode is selected (step H9). If it is determined that the transmission mode is selected, it is then checked if the input finger activated data is to be transmitted as character data or as coordinate data (step H10). When recognized data is to be sent, the contents of the R register are correspondingly changed (step H11). However, when unrecognized data is to be sent, the contents of the R register are also changed correspondingly (step H12). The flow advances to step H7 thereafter. When it is determined in step H9 that the selected mode is not the transmission mode, it is then checked if the normal mode is selected (step H7).

When the T register is "0", finger activated data is to be sent. When the T register is "1", data memory is to be sent.

When it is determined in step H13 that the selection switch S13 is ON, it is checked if finger activated data or memory data is to be sent (step H14). When the memory data is to be sent, the contents of the T register are changed for sending the finger activated data (step H16). When the handwritten data is to be sent, the contents of the T register are changed to send memory data (step H15). Thereafter, the flow advances to step H7 to check if the normal mode is selected.

The processing of the M, R and T registers has been described. Since the contents of each register cannot be changed directly, they are changed by updating them by unitary incrementation (i.e., the contents are changed in the order of 0→1→2→0 , 0→1→0).

In step H7, it is checked if the normal mode is selected. If the normal mode is selected, the display processing is performed (step K1) and the flow returns to the HALT state (step H1). If the normal mode is not selected, it is checked if the selected mode is the transmission or reception mode (step K2). If the transmission mode is selected, the transmission processing (step K4) is performed and the flow returns to the HALT state (step H1). When the reception mode is selected (step K2), the reception processing (step K3) is performed and the flow returns to the HALT state (step H1).

A description will now be made with reference to FIG. 12.

Figure 12:
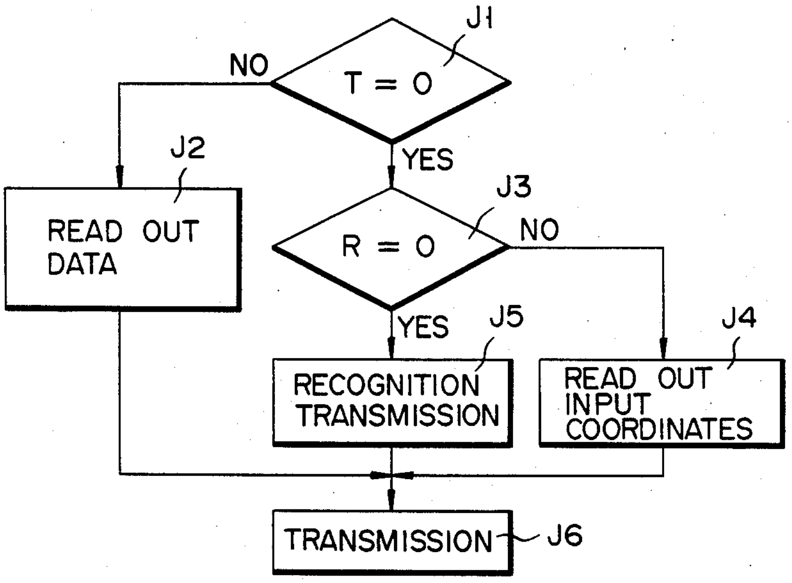
FIG. 12 is a flow chart of the transmission processing in the embodiment shown in FIG. 8.

FIG. 12 is a flow chart of the transmission processing (step K4).

It is first checked if finger activated data or memory data is to be sent (step J1). If memory data is to be sent, the contents of the memory are read out (step J2) and transmitted (step J6). If finger activated data is to be sent, it is then checked if such data is to be sent before or after recognition (step J3). If recognized data is to be transmitted, a recognition code is assigned and finger activated data is recognized (step J6). If the data is to be sent without recognition, input coordinates are read out and coordinate data is transmitted (step J4).

A description will now be made with reference to FIG. 13.

Figure 13:
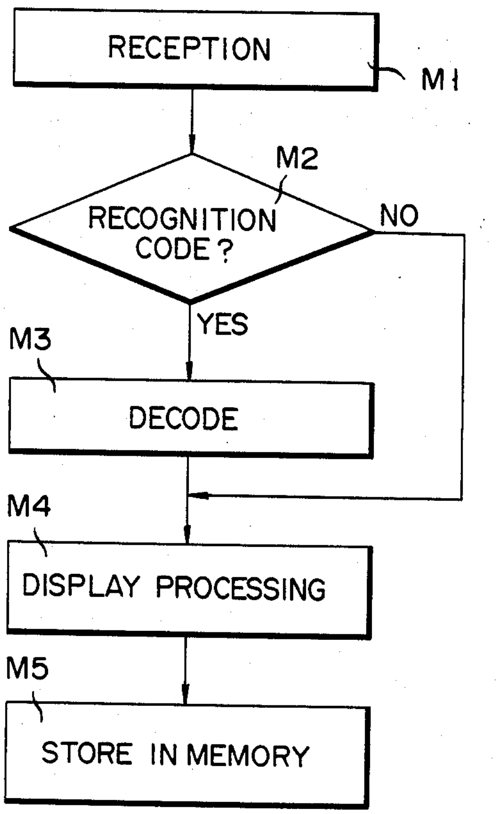
FIG. 13 is a flow chart of the reception processing in the embodiment shown in FIG. 8.

FIG. 13 is a flow chart of the reception processing (step K3).

In the reception mode (step M1), it is checked if the received data has a recognition code assigned thereto (step M2). If YES in step M2, the input data is decoded (step M3), displayed (step M4), and stored in the memory (step M5). However, if NO in step M2, the input data is displayed (step M4) and stored in the memory (step M5).

Figure 14:
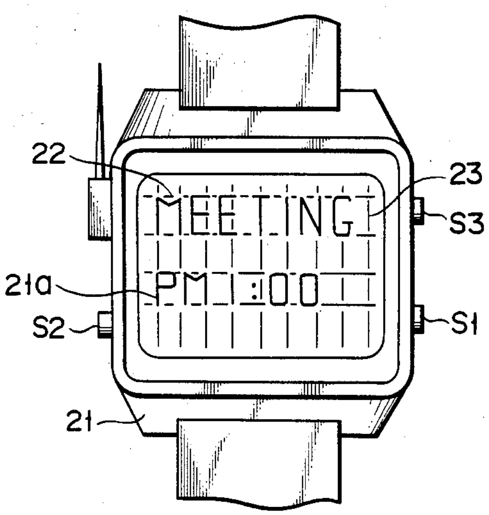
FIG. 14 is a view showing the display state when recognized data transmitted from another electronic wristwatch having a transmission/reception function is decoded and displayed.

FIG. 14 shows a display state wherein character and numeral data obtained by decoding recognized data received from another electronic wristwatch is displayed by the electronic wristwatch shown in FIG. 8.

Figure 15:
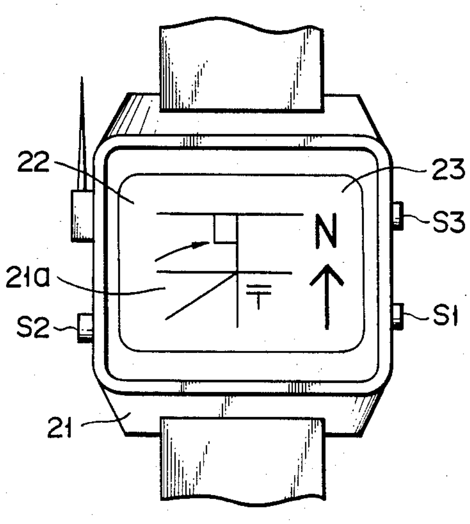
FIG. 15 is a view showing the display state when finger activating data transmitted from another electronic wristwatch having a transmission/reception function is displayed.

FIG. 15 shows a display state of graphic data by the electronic wristwatch in FIG. 8. In this case, finger activated data input at another electronic wristwatch is sent without recognition and is displayed without decoding. In this manner, a meeting time (characters and numerals), a meeting location (map including symbols and signs) and the like can be transmitted/received. According to an application of this function, after a message or the like is activated by a finger, recognized and transmitted, the signature of the sender is sent without recognition.

Figure 16:
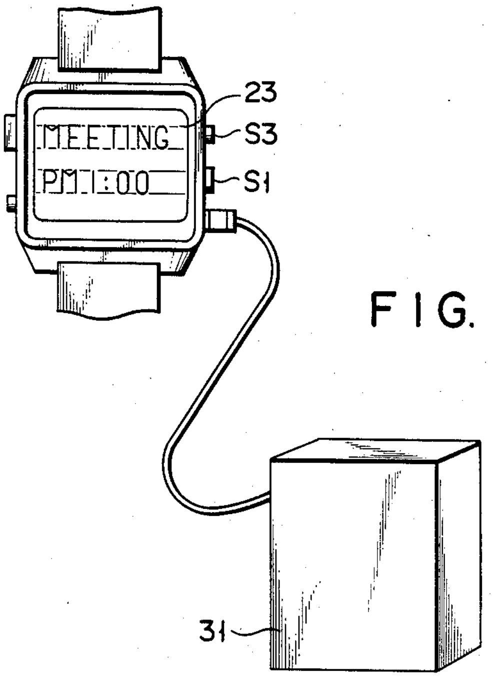
FIG. 16 shows an outer appearance when an electronic wristwatch according to an embodiment of the present invention is connected to a portable recognition device.

In an application shown in FIG. 16, a recognition device is not included in the electronic wristwatch, and a portable recognition device 31 for recognition purposes only is connected to the wristwatch as needed.

FIGS. 17 to 20 show still another embodiment of the present invention. The embodiment shown in FIGS. 17 to 20 is different from that shown in FIGS. 8 to 15 in that in the latter recognized or unrecognized handwritten data is transmitted, while in the former only recognized finger activated data or key input data is transmitted.

Figure 17:
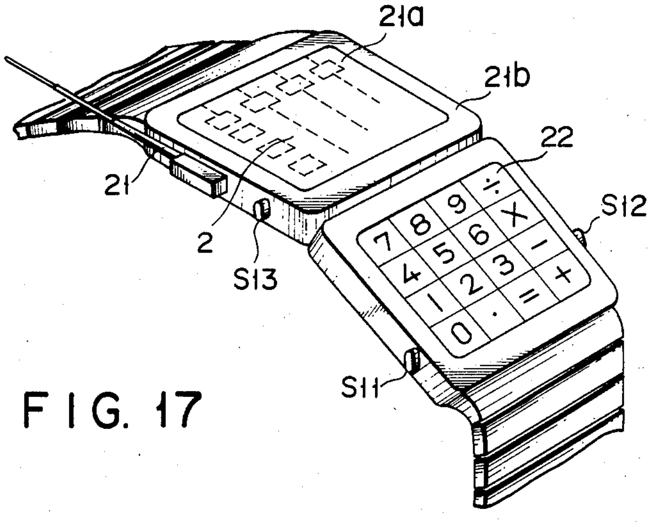
FIG. 17 shows an outer appearance of an electronic wristwatch functioning as a transmission/reception apparatus according to still another embodiment of the present invention.

FIG. 17 shows the outer appearance of an electronic wristwatch functioning as a transmission/reception apparatus according to this embodiment. This embodiment is different from that shown in FIG. 8 in that in the former a key input section 22 including numeral keys and function keys is arranged, and the switch S12 is used to select whether recognized finger activated data or key codes input through the input section 22 are to be sent.

Figure 2:
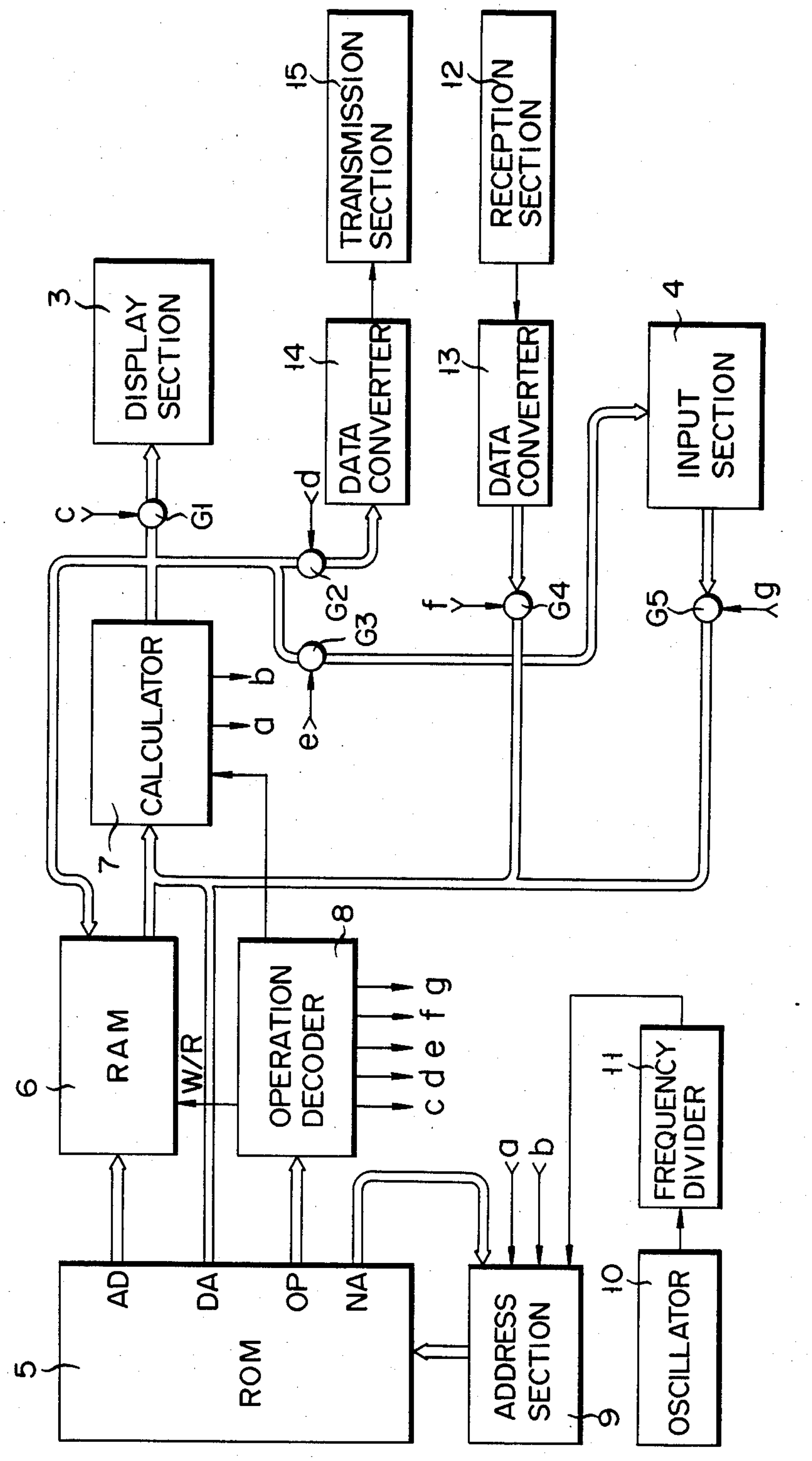
FIG. 2 is a block diagram showing the circuit configuration of the embodiment shown in FIG. 1.
Figure 18:
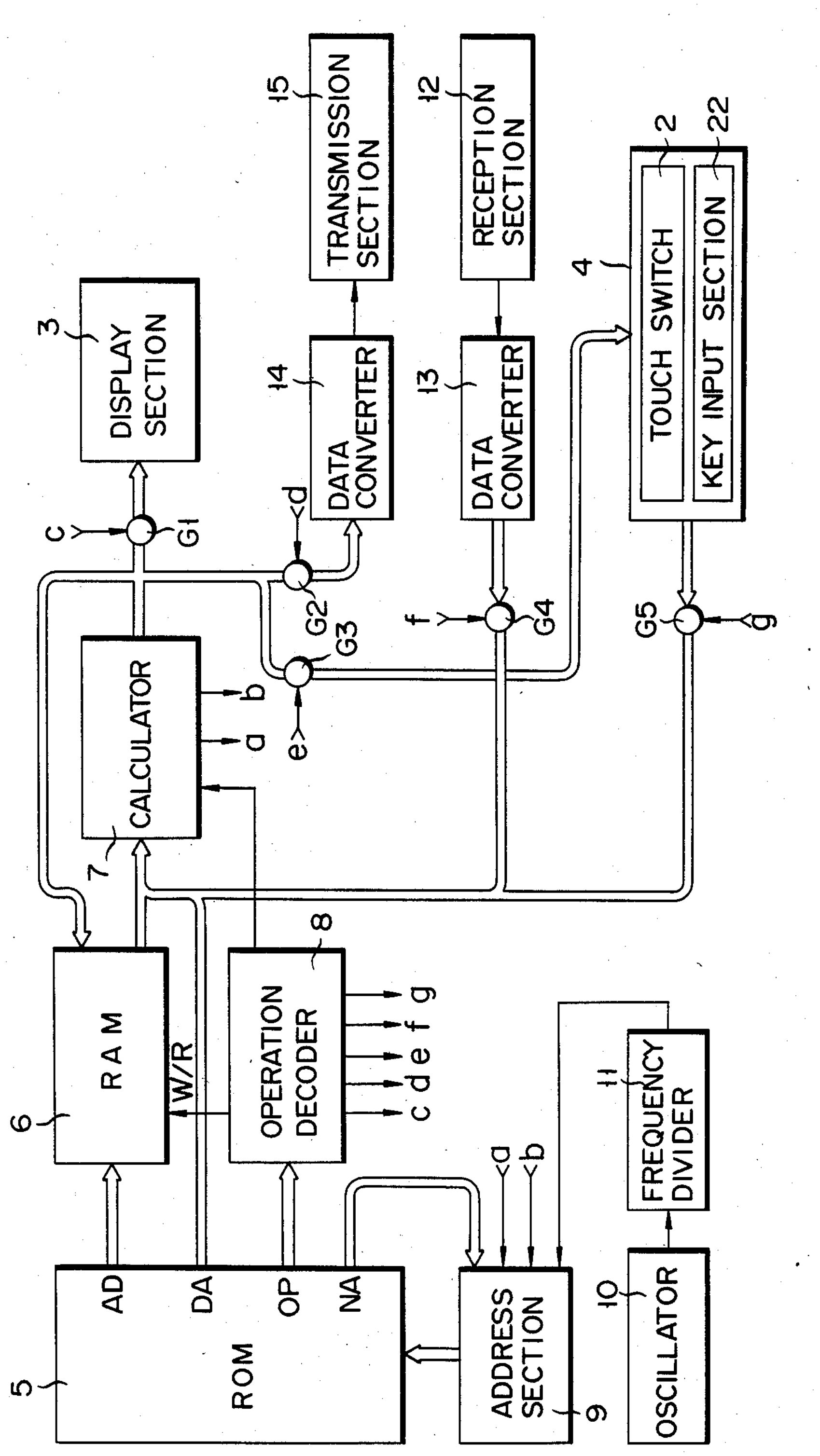
FIG. 18 is a block diagram of the circuit of the electronic wristwatch shown in FIG. 17.
Figure 19:
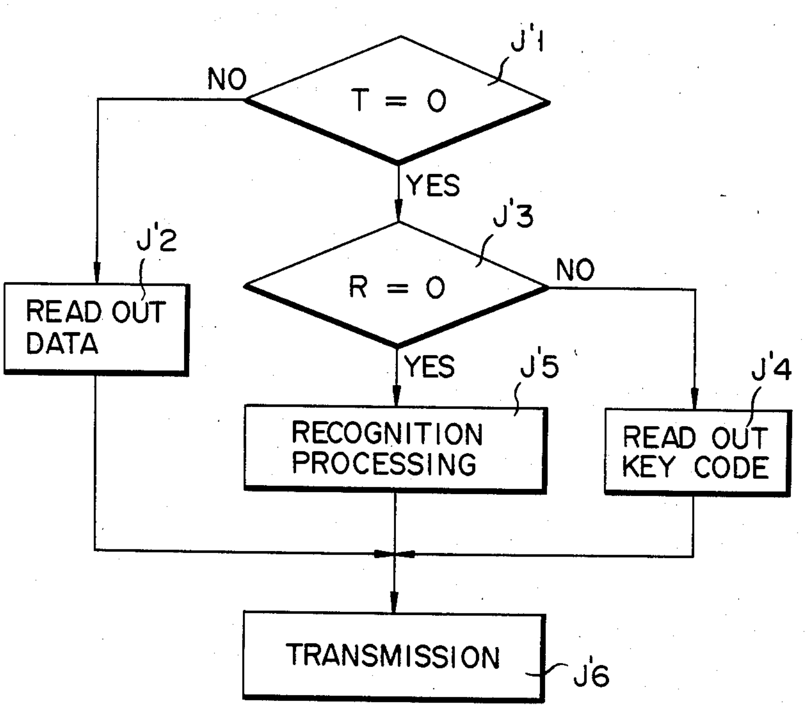
FIG. 19 is a flow chart of the transmission processing in the electronic wristwatch shown in FIG. 17.

FIG. 18 shows the circuit configuration of the embodiment shown in FIG. 17, and the same reference numerals as in FIG. 2 denote the same parts in FIG. 18 and a detailed description thereof will be omitted. The circuit shown in FIG. 18 is different from that shown in FIG. 2 in that a key input section 22 is incorporated in the input section 4 in addition to the touch switches 2.

Figure 10:
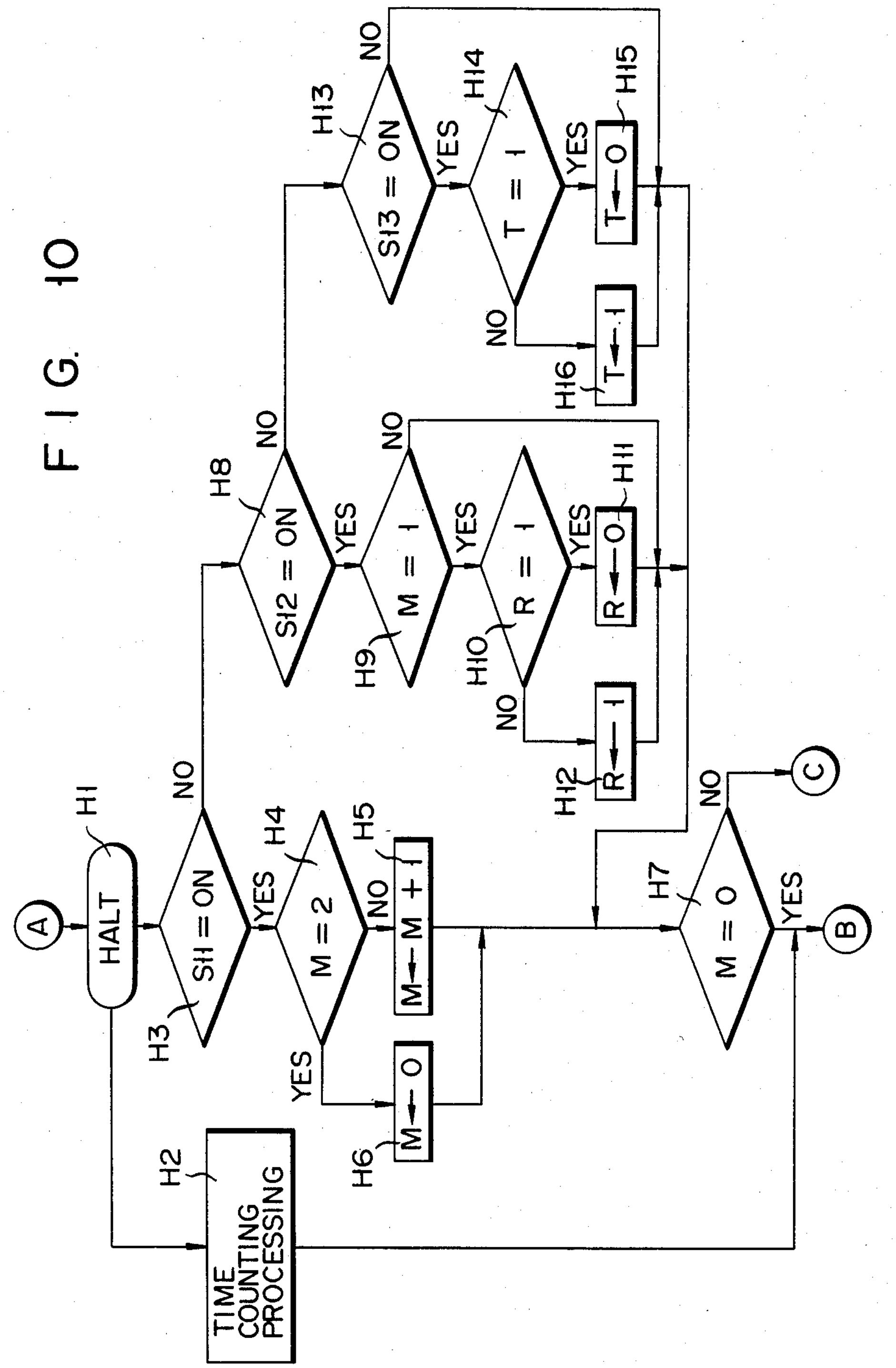
FIGS. 10 and 11 are flow charts of the operation of switches, registers and the like used in the embodiment shown in FIG. 8.
Figure 11:
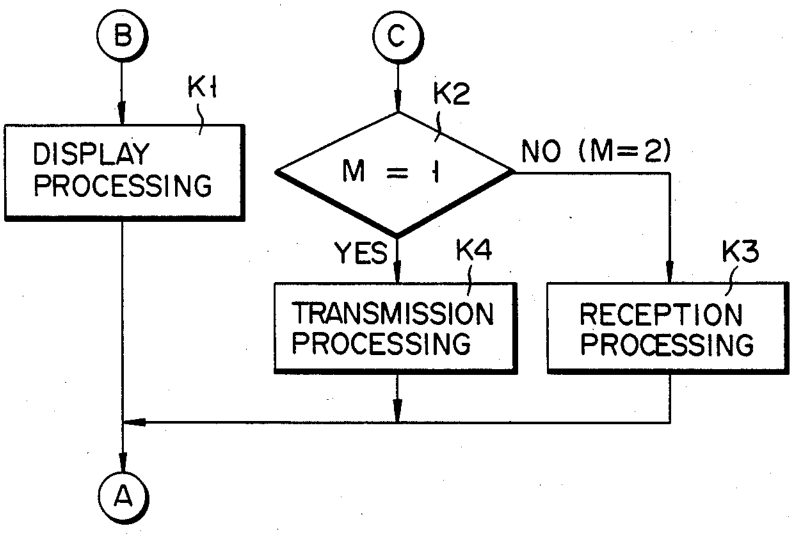

The general flow of this embodiment is substantially the same as that shown in FIGS. 10 and 11 and will not be described again. However, the flow of this embodiment is different from that shown in FIGS. 10 and 11 in that in FIG. 10 when the R register is "0", finger activated data input through a finger activated input means is transmitted, while in this embodiment a key code input through the key input section 22 is transmitted, and in that the contents of the R register are rewritten every time the switch S12 is depressed. With these changes, the transmission processing of FIG. 10 becomes that shown in FIG. 19.

It is first checked if handwritten data or memory data is to be transmitted (step J'1). If memory data is to be transmitted, the contents of the memory are read out (step J'2) and transmitted (step J'6). If finger activated data is to be transmitted, it is checked if a recognized finger activated character or a key code inputted through the key input section 22 is to be transmitted (step J'3). If a recognized finger activated character is to be transmitted, a recognition code is assigned to the input data and recognition of the character data is performed (step J'5) and thereafter the recognized data is transmitted (step J'6). When a key code is to be transmitted, the key code is read out (step J'4) and the read-out key code is transmitted (step J'6).

Figure 20:
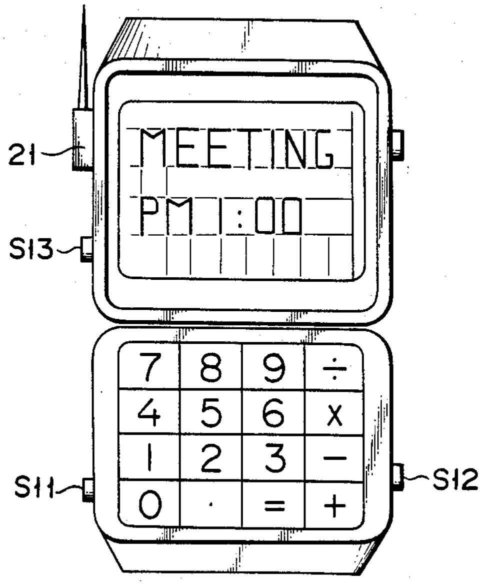
FIG. 20 is a view showing the display state wherein recognition data transmitted from another electronic wristwatch having a transmission/reception function is decoded and displayed by the electronic wristwatch shown in FIG. 17.

FIG. 20 shows a display state wherein characters and numerals are displayed by the electronic wristwatch functioning as the transmission/reception apparatus shown in FIG. 1.

With the above configuration, characters and figures can be input separately, so that the input operation is rendered easier. When transmitted data is received, characters or figures such as a meeting time and a meeting location can be displayed.

Figure 21:
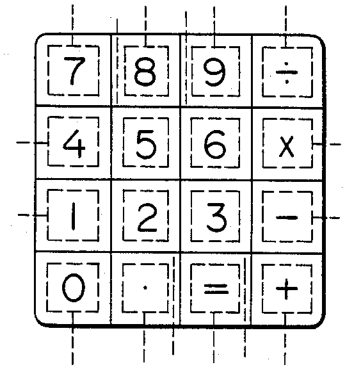
FIG. 21 is a diagram showing another example of a key input section of the electronic wristwatch shown in FIG. 17.

FIG. 21 is a diagram showing another example of the key input section. In this key input section, touch switches are arranged in correspondence with numerals 0 to 9 and the function characters, and are respectively connected to an LSI of the electronic wristwatch. Numerals and functions are input by touching the corresponding touch switches, and a finger activated character is input by tracing the touch switches.

Still another embodiment of the present invention will be described with reference to FIGS. 22 and 23.

Figure 22:
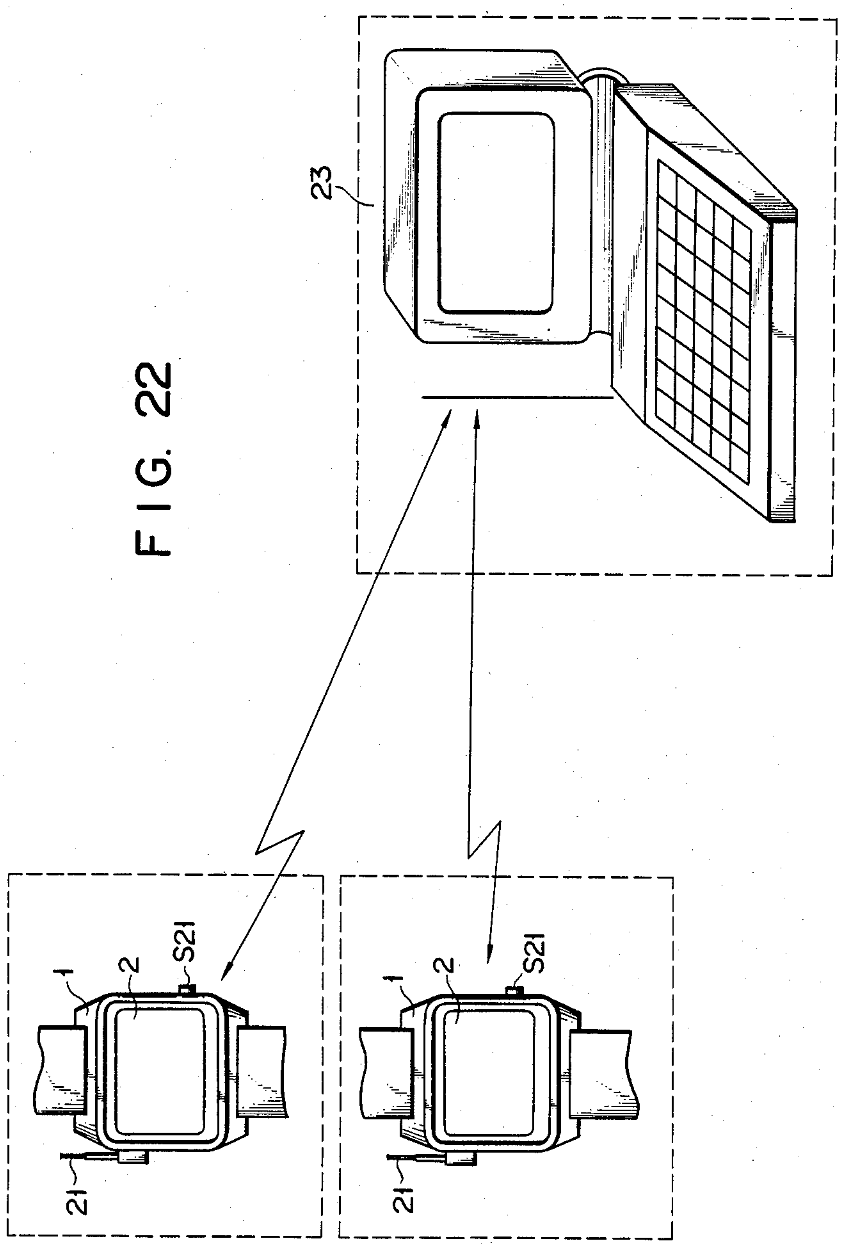
FIG. 22 is a diagram showing a system configuration of a station having electronic wristwatches functioning as transmission/reception apparatuses according to an embodiment of the present invention and a character recognition device.

In this embodiment, finger activated data input by a finger activated input means of an electronic wristwatch shown in FIG. 22 is transmitted to a station having a large character recognition circuit. The station recognizes the finger activated data and then transmits the recognized data to a station such as another electronic wristwatch.

Figure 23A:
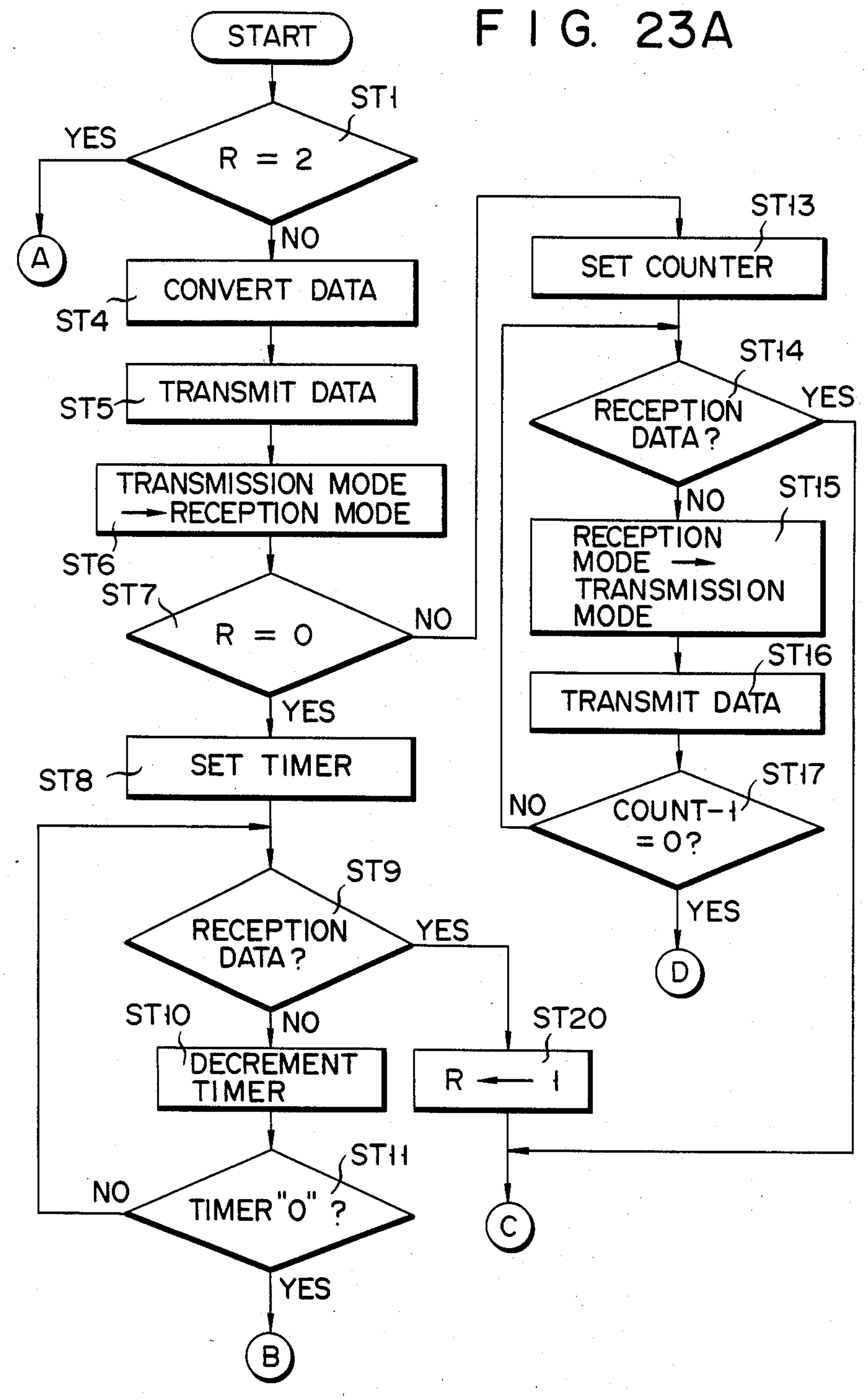
FIGS. 23A and 23B together form a flow chart for explaining the mode of operation of the electronic wristwatch shown in FIG. 21.
Figure 23B:
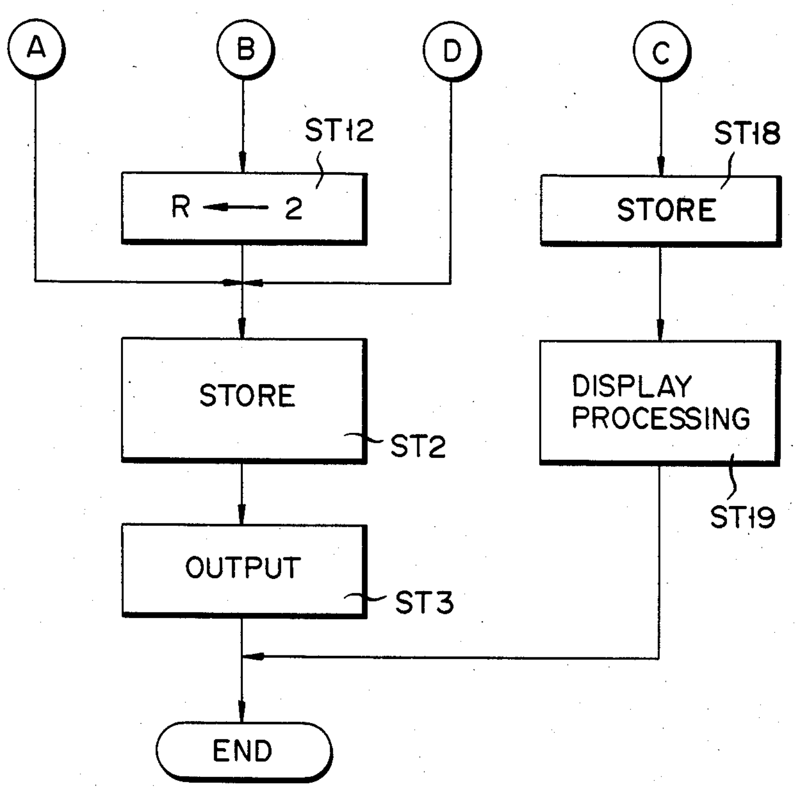

The same reference numerals as in FIG. 2 denote the same parts in FIGS. 22 and 23, and a detailed description thereof will be omitted.

In the electronic wristwatch having the structure and circuit configuration as described above, the writing operation in the RAM 6 as a recognition signal the coordinate signals of a handwritten signal input through an input section 14, will be described with reference to the flow chart shown in FIG. 23.

R=0, 1 and 2 indicate that the R register in the RAM 6 is respectively in the 0, 1 and 2 modes. More specifically, when the R register is in the 0 mode, it means that input data is first input data in the transmission mode. The 1 mode means that a station 23 is in the reception mode. The 2 mode means that transmission to the station 23 cannot be performed due to distance.

A switch S21 is depressed to change the mode of the electronic wristwatch from the timepiece mode to the transmission mode. Upon this switching operation, the processing flow of each character is performed upon reception of each 16 Hz clock from the address section 9. More specifically, an address signal is supplied to the ROM 5, a write signal is supplied from the operation decoder 8 to the RAM 6 under the control of the progam stored in the ROM 5, and the operation decoder 8 generates the gate control signals c to g so as to enable the gate circuits G3 and G5. When a character is activated by a finger on the touch electrodes 2, the coordinate signals of the finger activated character are supplied to the calculation section 7 in synchronism with the timing of the scan signal supplied from the calculation section 7 to the input section 4. In this case, a character may be activated by an equipment such as a pen. Then, it is checked if the R register is in the reception mode (step ST1). If the R register is not in the reception mode, the flow advances to step ST2. The coordinate data supplied to the calculation section 7 is temporarily stored in the RAM 6 in step ST2 and is supplied to the section 7 at a later time (step ST3). When it is determined that the R register is in the transmission mode, the flow advances to step ST4. In step ST4, the gate circuit G2 is enabled to supply the coordinate data to the data converter 14 through the gate circuit G2 under the control of the operation decoder 8, and the converted data from the converter 14 is supplied to the station 23 from the transmission section 15 (step ST5).

After the coordinate data is transmitted, the mode is changed from the transmission mode to the reception mode by a control signal from the ROM 5 (step ST6). The gate circuit G4 is enabled by the gate control signals c to g from the operation decoder 8 and a recognition signal corresponding to the coordinate data from the station is awaited. At this time, it is checked if the input data is first data received by the R register (step ST7). If YES, 10 seconds are set in a timer (step ST8). The counter is counted down (step ST10) while it is checked if a recognition signal is received (step ST9). Reception data is awaited until the timer becomes 0.

When a recognition signal is not received within the 10-sec period (YES in step ST11), the flow advances to step ST12. In step ST12, the R register is set in the 2 mode. Processing for transmitting at another time is performed through the calculation section 7 (steps ST2, ST3).

If it is determined in step ST7 that the input data is not the first data received, 3 is set in a timer (step ST13) and reception data is awaited. Until a recognition signal is received, a series of input confirmation of the reception data (step ST14), switching to the transmission mode (step ST15), and retransmission of the coordinate data (step ST16) is repeated three times. When the counter becomes 0 (YES in step ST17), processing for storing the coordinate data in the RAM 6 is performed (steps ST2, ST3).

However, if a recognition signal is transmitted from the station 23 to the reception section 12 (YES in step ST14), a recognition signal as a reception signal is stored in the RAM 6 through the data converter 14, the gate circuit G4 and the calculation section 17 (step ST18). At the same time, the recognition signal is displayed at the display section 3 through the enabled gate circuit G1 (step ST19). When reception data is present in step ST9, the flow advances to step ST20. In step ST20, the R register is set at "1" so as to store the data in the RAM 6 (step ST18) and display the data (step ST19).

As can be seen from the flow described above, since the coordinate data of a finger activated character input through the touch electrodes 2 is transmitted to the external station 23 having a large-capacity character recognition memory, the station 23 can recognize the character. The capacity of the character recognition pattern of the station 23 is large, and a large number of characters finger activated on the touch electrodes 2 can be recognized. A complex character can be recognized with ease. The recognition signal obtained can be stored in the RAM 6 through the reception section 12 inside the electronic wristwatch. Therefore, a large-capacity recognition circuit need not be incorporated in an electronic wristwatch, and the recognition signals of a large number of finger activated characters can be stored in the RAM 6.

According to the present invention, the electronic wristwatch can be rendered compactly, and a large amount of character recognition data, as compared to a conventional electronic electronic wristwatch, can be stored in a memory.

What is claimed is:

1. A radio wave data transmission watch apparatus, comprising:

switching means, including a plurality of switches, for generating switching signals when said switches are activated by a finger;

electronic circuit means including trace position data generating means for generating trace position data from the switching signals of said switching means when tracing on said switches with the finger, and recognizing means for recognizing a traced character from said traced position data and generating corresponding recognition data;

selecting means for selecting a type of data among said recognition data and said trace position data;

converting means for converting the data selected by said selecting means, and identifying data indicative of the selected type of data, into a radio signal; and transmitting means for transmitting the radio wave signal produced by said converting means.

2. An apparatus according to claim 1, wherein said plurality of switches of said switching means comprise touch switches.

3. An apparatus according to claim 1, wherein said transmitting means includes transmission output power control means for controlling a transmission output power.

4. An apparatus according to claim 3, wherein said transmission output power control means includes receiving means for receiving the radio wave signal; comparing means for comparing the data received by said receiving means with data transmitted by said transmitting means; and control means for controlling the power of said transmitting means in accordance with an output from said comparing means.

5. A radio wave data transmission watch apparatus, comprising:

case means of a portable size;

switching means, arranged on said case means and including a plurality of switches, for generating a switching signal when any one of said switches is activated by a finger;

electronic circuit means including trace position data generating means for generating trace position data from switching signals of said switching means when activating said switches with the finger, and recognizing means for recognizing a character from said trace position data and generating corresponding recognition data, and time counting means for counting timepiece data;

a display device for displaying the timepiece data obtained by said time counting means;

selecting means for selecting a type of data among said recognition data and said trace position data;

converting means for converting the data selected by said selecting means, and identifying data indicative of the selected type of data, into a radio wave signal; and transmitting means for transmitting the radio wave signal produced by said converting means.

6. An apparatus according to claim 5, wherein said electronic circuit means includes timepiece data output means for outputting the timepiece data of said time counting means to said converting means.

7. An apparatus according to claim 5, wherein said case means has a protective glass for protecting said display device, and said plurality of switches comprise touch switches arranged on said protective glass.

8. An apparatus according to claim 5, wherein said transmitting means includes transmission output power control means for controlling a transmission output power.

9. An apparatus according to claim 8, wherein said transmission output power control means includes receiving means for receiving the radio wave signal; comparing means for comparing the data received by said receiving means with data transmitted by said transmitting means; and control means for controlling the power of said transmitting means in accordance with an output from said comparing means.

10. An apparatus according to claim 5, wherein said case means is a wristwatch case.

11. A radio wave data transmission apparatus, comprising:

first and second radio wave data transmission apparatus, said first radio wave data transmission apparatus including:

switching means, including a plurality of switches, for generating a switching signal when any one of the switches is activated by a finger;

an electronic circuit for generating trace position data in accordance with the switching signal from said switching means;

first converting means for converting trace position data generated by said electronic circuit means into a first radio wave signal;

first transmitting means for transmitting the first radio wave signal produced by said converting means;

first receiving means for receiving from said second radio wave data transmission apparatus a radio wave signal based on recognized data converted by said first converting means;

second converting means for converting the radio wave signal received by said first receiving means into character data; and memory means for storing the character data obtained by said second converting means;

said second radio wave data transmission apparatus including:

second receiving means for receiving from said first radio wave data transmission apparatus said first radio wave signal based on said trace position data as converted by said first converting means;

third converting means for converting said first radio wave signal received by said second receiving means into received trace position data;

recognizing means for recognizing character data based on said received trace position data obtained by said third converting means;

fourth converting means for converting said character data recognized by said recognizing means into a second radio wave signal; and second transmitting means for transmitting said second radio wave signal produced by said fourth converting means.

12. An apparatus according to claim 11, wherein said first radio wave data transmission apparatus further comprises a display device for displaying the character data stored in said memory means.

13. A radio wave data transmission watch apparatus, comprising:

electronic circuit means for generating data;

first converting means for converting said data generated by said electronic circuit means into a radio wave signal;

transmitting means for transmitting the radio wave signal produced by said converting means;

receiving means for receiving the radio wave signal;

second converting means for converting the radio wave signal received by said receiving means into data; and transmission output power control means for controlling a transmission output power, said transmission output power control means including comparing means for comparing the data received by said receiving means with data transmitted by said transmitting means, and control means for controlling the power of said transmitting means in accordance with an output from said comparing means.

* * * * *